(12) United States Patent
Hasabnis et al.

(10) Patent No.: US 12,386,669 B2
(45) Date of Patent: Aug. 12, 2025

(54) METHODS AND APPARATUS TO DETERMINE EXECUTION COST

(71) Applicant: Intel Corporation, Santa Clara, CA (US)

(72) Inventors: Niranjan Hasabnis, Fremont, CA (US); Justin Gottschlich, Santa Clara, CA (US); Jesmin Jahan Tithi, San Jose, CA (US); Anand Venkat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 17/541,016

(22) Filed: Dec. 2, 2021

(65) Prior Publication Data

US 2022/0091895 A1    Mar. 24, 2022

(51) Int. Cl.
G06F 9/50 (2006.01)
G06F 9/30 (2018.01)
G06F 9/38 (2018.01)
G06F 9/455 (2018.01)

(52) U.S. Cl.
CPC ........ G06F 9/5044 (2013.01); G06F 9/30101 (2013.01); G06F 9/3836 (2013.01); G06F 9/4552 (2013.01); G06F 9/5016 (2013.01); G06F 9/5038 (2013.01)

(58) Field of Classification Search
CPC ...... G06F 8/443; G06F 9/4552; G06F 9/5044; G06F 9/5016; G06F 9/5038; G06F 9/30101; G06F 9/3836
USPC .................................................. 717/151–161
See application file for complete search history.

(56) References Cited

U.S. PATENT DOCUMENTS

| | | | |
|---|---|---|---|
| 9,811,335 B1 * | 11/2017 | Khainovski | G06F 9/30196 |
| 2011/0231830 A1 * | 9/2011 | Udayakumaran | G06F 8/4441 717/160 |
| 2022/0155769 A1 * | 5/2022 | Zhou | H04M 15/00 |

FOREIGN PATENT DOCUMENTS

| | | | | |
|---|---|---|---|---|
| CN | 104424363 B | * | 9/2019 | G06F 16/20 |
| CN | 106874332 B | * | 6/2020 | G06F 16/2433 |

OTHER PUBLICATIONS

LLVM, "ILVM-MCA—LLVM Machine Code Analyzer," LLVM Compiler Infrastructure, Synopsis, 2021, retrieved Jul. 5, 2023. [Online]. Available: https://llvm.org/docs/CommandGuide/llvm-mca.html, 18 pages.

Park, "Predicting program execution times by analyzing static and dynamic program paths," Real Time Systems, vol. 5, Mar. 1993, 32 pages.

(Continued)

Primary Examiner — Ted T. Vo
(74) Attorney, Agent, or Firm — Hanley, Flight & Zimmerman, LLC

(57) ABSTRACT

Methods, apparatus, systems, and articles of manufacture to determine execution cost are disclosed. An example apparatus includes memory; instructions included in the apparatus; and processor circuitry to execute the instruction to: cause a plurality of instructions corresponding to a mnemonic to be executed; determine an average execution cost of the plurality of instructions; determine a standard deviation of execution costs of the plurality of instructions; and generate a mapping table including an entry, the entry including the mnemonic in association with the average and the standard deviation.

21 Claims, 9 Drawing Sheets

(56) References Cited

OTHER PUBLICATIONS

Fahringer et al., "A static parameter based performance prediction tool for parallel programs," in Proceedings of the 7th international conference on Supercomputing, Jul. 19, 1993, 13 pages.
Rugina et al., "Predicting the running times of parallel programs by simulation," in IEEE, Mar. 30, 1998, 7 pages.
Derumigny et al., "From micro-OPs to abstract resources: constructing a simpler CPU performance model through microbenchmarking," arXiv, dated Sep. 16, 2021, 16 pages.
Sanchez et al., "ZSim: Fast and accurate microarchitectural simulation of thousand-core systems," ACM SIGARCH Computer architecture news, Jun. 2013, 12 pages.
Xu et al., "Explainable AI: A Brief Survey on History, Research Areas, Approaches and Challenges," Natural Language Processing and Chinese Computing: 8th CCF International Conference, NLPCC 2019, Oct. 9, 2019, 12 pages.
Li et al., "LightRNN: Memory and Computation-Efficient Recurrent Neural Networks," 30th Conference on Neural Information Processing Systems (NIPS 2016), Barcelona, Spain, Dec. 5, 2016, 9 pages.
Gottschlich et al., "The three pillars of machine programming," in 2nd ACM SIGPLAN International Workshop on Machine Learning and Programming Languages, Philadelphia, Jun. 18, 2018, 12 pages.
Laukemann et al., "Automated instruction stream throughput prediction for Intel and AMD microarchictectures," in IEEE/ACM Performance Modeling, Benchmarking and Simulation of High Performance Computer Systems (PMBS), Nov. 12, 2018, 11 pages.
Intel, "Intel architecture code analyzer (IACA)," [Online]. Available: https://software.intel.com/content/www/us/en/develop/articles/intel-architecture-code-analyzer.html, 2019, 4 pages.
Abel et al., "Characterizing Latency, Throughput, and Port Usage of Instructions on Intel Microarchitectures," in Twenty-Fourth International Conference on Architectural Support for Programming Languages and Operating Systems, Apr. 13, 2019, 14 pages.
Mendis et al., "Ithemal: Accurate, Portable and Fast Basic Block Throughput Estimation using Deep Neural Networks," 36th International Conference on Machine Learning (ICML) 2019, May 30, 2019, 14 pages.
Blanco et al., "Predicting the performance of parallel programs," ELSEVIER, Parallel Computing, accepted Nov. 20, 2003, 20 pages.
Dauphin et al., PEPP: Performance Evaluation of Parallel Programs, Erlangen, User's Guide version 3.3, Sep. 1993, 78 pages.

\* cited by examiner

METHODS AND APPARATUS TO DETERMINE EXECUTION COST

FIELD OF THE DISCLOSURE

This disclosure relates generally to computing systems and, more particularly, to methods and apparatus to determine execution cost.

BACKGROUND

Processor resources are needed to execute instructions to perform one or more tasks. The amount of processor resources needed to execute the instructions corresponds to an execution cost of the instructions. The execution cost may correspond to a total number of cycles and/or seconds to execute the program. Because different computer architectures are structured differently, a program designed for one type of computer architecture may have a different execution cost for another computer architecture. A computing system may use execution cost of code to attempt to optimize instruction, improve instructions, and/or otherwise lower the execution cost of the instructions. For example, machine programming may rely on execution cost when attempting to replace low-performance instructions with high-performance instructions based on the execution cost of both sets of instructions.

DETAILED DESCRIPTION

Figure 1:
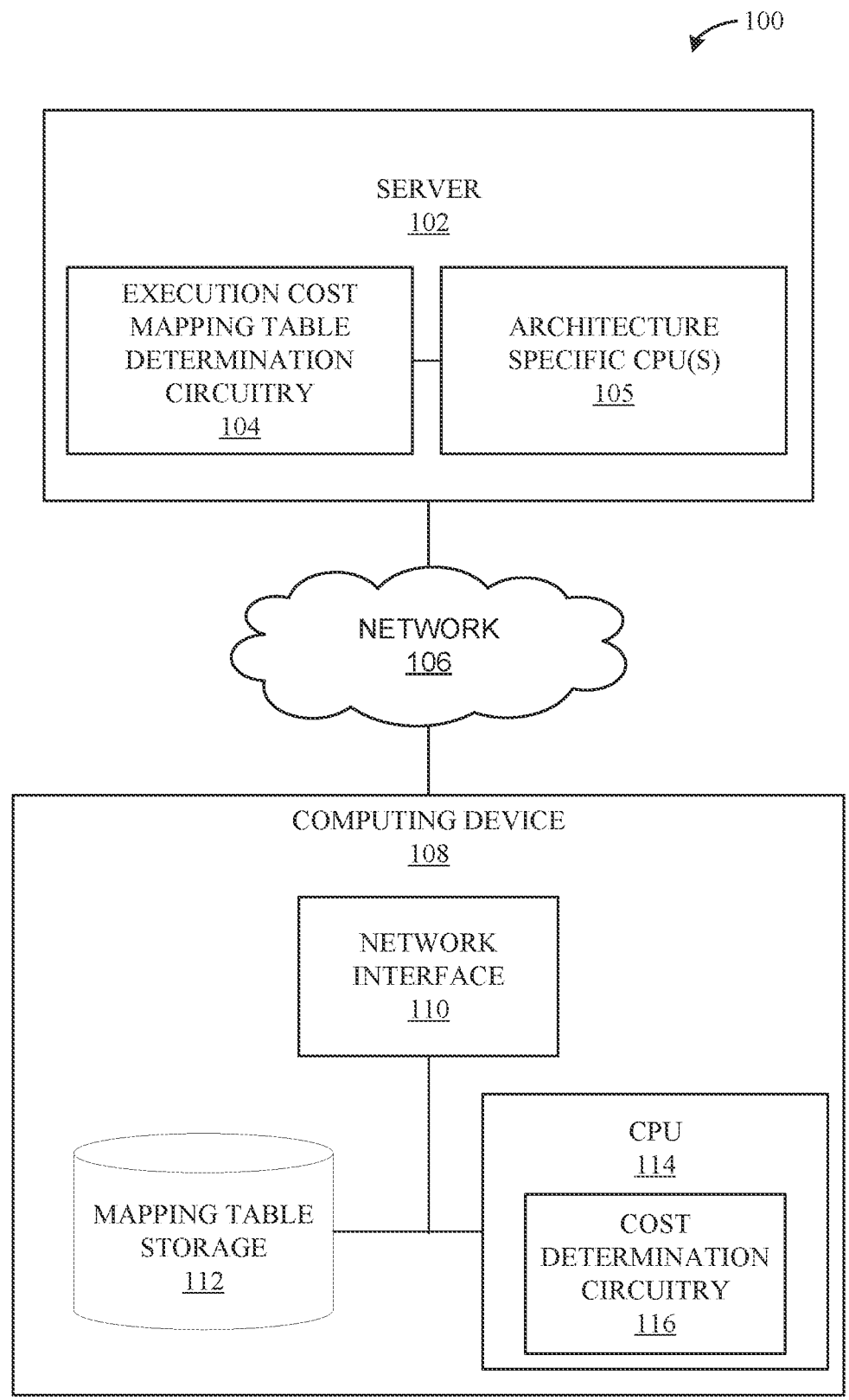
FIG. 1 is an example environment to determine the execution cost in conjunction with examples disclosed herein.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

Accurate and efficient determination of a program's cost (e.g., total number of clock cycles and/or seconds to complete a program) is desirable in many different applications (e.g., code optimization, design of hardware (e.g., compilers), design of software (e.g., binary translators), code recommendation systems, schedulers on cloud or clusters, etc.). For example, compiler backends may select instructions by relying on an estimation of execution cost. To determine execution cost of instructions, some techniques simply execute them on the actual hardware. However, such techniques are expensive and time consuming. Other techniques have been used to estimate execution cost using models and/or other tools. However, such techniques may be inaccurate and/or require large maintenance overhead. Some techniques use artificial intelligence (AI) to predict the execution cost of a set of instructions. Although such techniques are accurate, such techniques are computationally-intensive and, moreover, AI-based techniques do not provide an explanation for a result. Accordingly, the reason for why the AI-based techniques determined that the code corresponds to an execution cost is unknown.

Examples disclosed herein develop an approach that is accurate, explainable, and executes using less processor resources than the above-mentioned techniques. Examples disclosed herein include a server that develops architecture-specific mapping tables that map converted instructions (e.g., abstractions of instructions based on the leading mnemonic and/or function of an instruction line) to an average execution cost and standard deviation cost. Using examples disclosed herein, the server can obtain programs and/or basic blocks of code from storage (e.g., open-source repositories, crowd-sourced repositories, closed-source repositories, local storage, external stored, local databases, external databases, etc.), execute lines of the code to identify execution costs corresponding to the function and/or mnemonic of the line of code and map the mnemonic to the average execution cost and the standard deviation of the execution cost. For example, examples disclosed herein may identify 10 instances of instructions that begin with the mnemonic "add," execute the 10 instances on a CPU corresponding to a particular architecture and determine that the average cycles needed to execute the instruction was 3 with standard deviation of 1. In this manner, examples disclosed herein map the mnemonic "add" to a "3" average and a "1" standard deviation. As used herein, a basic block is a sequence of instructions or program, where the control flows sequentially through the sequence.

After a threshold number of programs and/or blocks of code have been mapped, examples disclosed herein can deploy the mapping table to computing devices within a network that may or may not correspond to the particular computer architecture. In this manner, the computing system can use the mapping to estimate the execution cost of a program corresponding to a basic block by identifying mnemonic for each line of the program and determining the corresponding average and/or standard deviation of the execution cost using the mapping table, thereby requiring far less resources and time than the above-mentioned techniques. In some examples, the architecture of the computing device during deployment could be different than the architecture of the mapping table. Additionally, the mapping provides the reasoning and/or explainability for the cost of a program line-by-line.

FIG. 1 is a block diagram of an example environment 100 described in conjunction with examples disclosed herein. The example environment 100 includes an example server 102, example execution cost mapping table determination circuitry 104, example architecture-specific CPU(s) 105, an example network 106, an example computing device 108, an example mapping table storage 112, an example CPU 114, and an example basic block execution cost determination circuitry 116.

The example server(s) 102 of FIG. 1 may be server(s) and/or any other computing device(s) that generates mapping tables. The example server 103 may access blocks of code stored locally or externally (e.g., a code repository/storage/database stored locally or externally). After blocks of code have been obtained, the example execution cost mapping table determination circuitry 104 processes the blocks of code to generate a mapping table that links average and standard deviation of execution cost to a mnemonic and/or function of a line of instruction. As further described below, the execution cost mapping table determination circuitry 104 processes the lines of the blocks of code and generates the mnemonic by abstracting out specific numerical and/or register values. In this manner, instructions corresponding to the same mnemonic are executed by one or more of the architecture-specific CPU(s) 105 and the execution cost is identified. In some examples, the architecture of the server 102 and the computing device 108 are different. For example, the computing device 108 may be a client device that has CPU for a first architecture but is optimizing a program written for a second architecture using the mapping table for the second architecture. This may occur because compilers may support a cross compilation mode, where a compiler running on the second architecture can generate or optimize a program written for the first architecture. The execution cost for each instruction corresponding to the same mnemonic are averaged and a standard deviation is calculated. The mnemonic is stored in a mapping table in conjunction with the corresponding average and standard deviation. In this manner, the computing device 108 can use the entry in the mapping table to estimate execution cost based on a program that includes a line of code that corresponds to the mnemonic.

Because execution cost for the same instruction may be different for different architectures, the example server 102 of FIG. 1 includes the different architecture-specific CPU(s) 105 to execute code according to different specific architectures. The architecture-specific CPU(s) 105 executes code and outputs execution cost corresponding to the executed code. For example, the architecture-specific CPU(s) 105 acts as a driver program with necessary boilerplate code around concrete assembly instructions to execute individual instructions in a loop to reach a steady state (e.g., 100 iterations) and measure execution cost based on the iterations. In this manner, the execution cost mapping table determination circuitry 104 can develop architecture-specific mapping tables that can be deployed to computing devices. The example execution cost mapping table determination circuitry 104 is further described below in conjunction with FIG. 2.

The example network 106 of FIG. 1 is a system of interconnected systems exchanging data. The example network 106 may be implemented using any type of public or private network such as, but not limited to, the Internet, a telephone network, a local area network (LAN), a cable network, and/or a wireless network. To enable communication via the network 106, the example server(s) 102 and/or the computing device 108 includes a communication interface that enables a connection to an Ethernet, a digital subscriber line (DSL), a telephone line, a coaxial cable, or any wireless connection, etc. In some examples, the server(s) 102 and the example computing device 108 are connected via the example network 106.

The example computing device 108 of FIG. 1 obtains determined mapping tables from the server 102 (e.g., via the network 106) and uses the mapping table to estimate the execution costs of programs. The example computing device 108 may be a server, an edge-based device, a cloud-based device, an internet of thing (IoT) device, a computer, a mobile device, a tablet, and/or any other type of computing device. The example computing device 108 includes the example network interface 110 to obtain the determined mapping table corresponding to the architecture of the computing device 108 from the server 102 via the network 106. An obtained mapping table is stored in the mapping table storage 112 of the example computing device 108. Additionally, the network interface 110 may obtain mapping table updates and/or replacements. In such examples, the updates and/or replacements are used to update the mapping table stored in the example mapping table storage 112.

The example CPU 114 of FIG. 1 executes instructions (e.g., a program and/or code) to perform one or more tasks. In some examples, the CPU 114 may instruct the basic block execution cost determination circuitry 116 to determine the cost of program, block of code, and/or instruction. The basic block execution cost determination circuitry 116 of FIG. 1 determines the cost by traversing through the code line-by-line and determining a range of the execution cost of each line of code based on the execution cost and standard deviation corresponding to the mnemonic of the line using the mapping table stored in the example mapping table storage 112. For example, when the basic block execution cost determination circuitry 116 processes a line of code, the cost determination circuitry determines the mnemonic and/or function part of the line of code (e.g., "add," "div," "store," etc.). After the mnemonic is obtained, the basic block execution cost determination circuitry 116 accesses the mapping table in the mapping table storage 112 to identify an average and standard deviation for the determined mnemonic. The example basic block execution cost determination circuitry 116 determines an execution cost maximum and minimum based on the average and standard deviation. After the maximum and minimum execution costs of each line is determined, the example basic block execution cost determination circuitry 116 determines the average execution cost and standard deviation cost for the code based on the maximum and minimum execution costs. If the basic block execution cost determination circuitry 116 is unable to match the determined mnemonic with a mnemonic in the mapping table, the basic block execution cost determination circuitry 116 may determine the average and standard deviation of the line of code based on present values (e.g., the mean, median, or mode of the average execution cost and/or the mean, median, or mode of the standard deviation execution cost across the mnemonics of the mapping table). The example basic block execution cost determination circuitry 116 is further described below in conjunction with FIG. 2.

Figure 2:
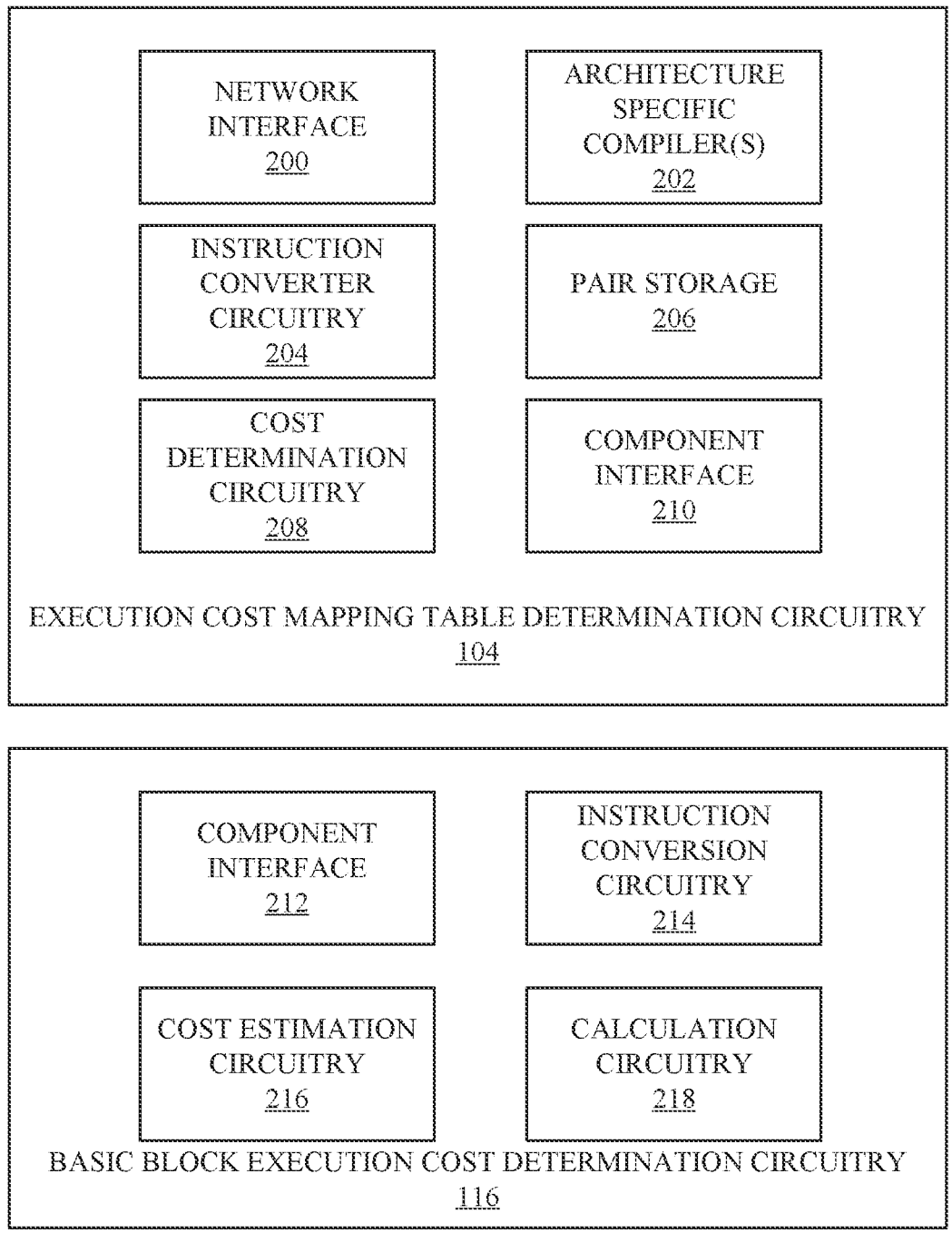
FIG. 2 is a block diagram of an implementation of the execution cost mapping table determination circuitry and the basic block execution cost determination circuitry of FIG. 1.

FIG. 2 is a block diagram of an example implementation of the example execution cost mapping table determination circuitry 104 and the example basic block execution cost determination circuitry 116 of FIG. 1. The example execution cost mapping table determination circuitry 104 includes an example network interface 200, example architecture-specific compiler(s) 202, example instruction converter circuitry 204, example pair storage 206, example cost determination circuitry 208, and an example component interface 210. The example basic block execution cost determination circuitry 116 includes an example component interface 212, example instruction conversion circuitry 214, example cost estimation circuitry 216, and example calculation circuitry 218.

The example network interface 200 of FIG. 2 transmits mapping tables to computing device(s) (e.g., the computing device 108) via the network 106. In some examples, the network interface 200 obtains instructions, code, programs, and/or basic blocks from one or more external repositories, storage, and/or databases.

The example architecture-specific compiler(s) 202 compiles high level code into assembly code corresponding to a target architecture. The example architecture-specific compiler(s) 202 may be a single compiler to compile high level code into multiple architectures or may be multiple compilers (e.g., a first compiler for a first architecture, a second compiler for a second architecture, etc.). The example architecture-specific compiler(s) 202 may be GNU compiler collection (GCC), Intel® C++ Compiler (ICC), low level virtual machine (LLVM), etc. that compile(s) input programs using different permutations of compiler options (e.g., −O2, −march=T, etc.). Additionally, the example architecture-specific compiler(s) 202 may convert commands in makefiles (e.g., if available).

The example instruction converter circuitry 204 of FIG. 2 converts lines of assembly code into mnemonic and operands. For example, the instruction converter circuitry 204 may convert "add $2, % rax" into "add" and "$2, % rax." After converting in the mnemonic and operands, the example instruction convert circuitry 204 abstracts the command by removing the values and/or variables that correspond to numbers and/or registers and replaces them with tokens corresponding to the value type. For example, operands that include numerical constants will be replaced with tokens corresponding to numerical type (e.g., integer, real number, Boolean, etc.) and operands that correspond to register will be replaced with a token corresponding to register. Additionally, the example instruction converter circuitry 204 pairs the assembly instruction with the corresponding abstraction and stores the pair in the example pair storage 206. In some examples, before storing the paid storage 206, the example instruction converter circuitry 204 determines if the pair and/or the abstraction and token is already stored in the pair storage 206, the instruction converter circuitry 204 may discard the pair (e.g., because a duplicate instruction may not add diversity to the stored pairs when determining execution cost information). The example instruction converter circuitry 204 may continue to process additional input programs until a threshold number of pairs are stored in the example pair storage 206. The threshold may be based on user and/or manufacturer preferences.

The example cost determination circuitry 208 of FIG. 2 accesses the example pair storage 206 to access one or more stored pairs. The example cost determination circuitry 208 may identify the pairs that correspond to the same mnemonic (e.g., with different operands) based on the abstraction. The cost determination circuitry 208 transmits (e.g., via the component interface 210) the pairs of corresponding to the same mnemonic to the architecture-specific CPU 105 (e.g., corresponding a specific architecture that corresponds to the architecture of the architecture-specific compiler 202) and obtains (e.g., via the component interface 210) the execution cost for each of the instructions. The example cost determination circuitry 208 determines the average and standard deviation of the execution costs of the plurality of instructions corresponding to the same mnemonic. After the average and standard deviation corresponding to the mnemonic are determined, the cost determination circuitry 208 generates an entry for a mapping table to include the mnemonic and corresponding average and standard deviation cost.

The example component interface 210 of FIG. 2 transmits instructions to be executed to the example architecture-specific CPU(s) 105. Additionally, the example component interface 210 obtains execution cost of executing the instructions from the architecture-specific CPU(s) 105. In some examples, the component interface 210 may obtain high level instructions, code, and/or basic blocks from internal storage of the server 102 (e.g., when the server 102 includes storage, one or more databases, and/or one or more repositories including code).

The example component interface 212 of FIG. 2 of the example basic block execution cost determination circuitry 116 accesses mapping tables from the example mapping table storage 112. As described above, the network interface 110 of the computing device 108 obtains the mapping table from the server 102 and stores the mapping table into the example mapping table storage 112. Additionally, the example component interface 212 may obtain instructions to determine the execution cost of a program from the example CPU 114. The example component interface 212 obtains a basic block, program, and/or code in assembly language to determine the execution cost. After the execution cost is determined, the example component interface 212 transmits the execution cost to the example CPU 114 or another device.

The example instruction conversion circuitry 214 of FIG. 2 converts obtained and/or determined assembly language code into individual lines. In some examples, the CPU 114 includes a compiler to convert high level language into the assembly language. After the code is broken up into individual instructions, the example instruction conversion circuitry 214 identifies the mnemonic (e.g., function) of the individual instructions. For example, the instruction conversion circuitry 214 may identify the mnemonic "div" from the instructions "div $2."

The example cost estimation circuitry 216 processes the mnemonics of the basic block, code, and/or program to determine an execution cost for the basic block, code, and/or program and/or a standard deviation for the basic block, code, and/or program. For example, for an instruction that corresponds to a "mov" mnemonic, the cost estimation circuitry 216 accesses the mapping table to identify an entry for the mnemonic "mov." After the corresponding entry is identified, the cost estimation circuitry 216 determines corresponding execution cost average (e.g., also referred to as range average, Ravg) and execution cost standard deviation (e.g., also referred to as range standard deviation, Rstdev) of the mnemonic from the mapping table. If the mnemonic of the instruction is not included in the mapping table, the example cost estimation circuitry 216 may use a preset value for the execution cost average and the execution standard deviation. In some examples, the cost estimation circuitry 216 selects the preset value based on the average execution cost and average standard deviation across the mnemonics from the mapping table.

The example calculation circuitry 218 of FIG. 2 calculates the execution cost of the program (e.g., also referred to as a range summation) and a standard deviation for the execution cost of the program using the average execution cost and standard deviation of the execution cost of the instructions of the program, code, and/or basic block. For example, the calculation circuitry 218 may determine a minimum execution cost and/or cost range for a particular instruction using the below Equation 1, a maximum execution cost and/or cost range for the particular instruction using the below Equation 2, and the execution cost for the program (e.g., range summation) using the below Equation 3 (e.g., the sum of the average costs for the instructions of the program, code, and/or basic block).

$$\min(R) = R_{avg} - R_{stdev} \quad \text{(Equation 1)}$$

$$\max(R) = R_{avg} + R_{stdev} \quad \text{(Equation 2)}$$

$$\text{range\_summation}(R_1, \ldots, R_n) = R_1 + R_2 + \ldots + R_n \quad \text{(Equation 3)}$$

In the above Equations 1-3, Ravg is the average execution cost for an instruction and Rstdev is the standard deviation for the execution cost. Because standard deviation may provide valuable information that is not included in the range summation, the example calculation circuitry 218 also calculates the standard deviation of the minimum execution costs and maximum execution costs of the instructions of the program, code, and/or basic block, as shown in the below Equation 4.

$$\text{standard\_deviation}(R_1, \ldots, R_n) = \sigma(\min(R_1), \ldots, \min(R_n), \max(R_1), \ldots, \max(R_n)) \quad \text{(Equation 4)}$$

The example calculation circuitry 218 transmits the execution cost and standard deviation of the program, code, and/or basic block to the CPU 114 and/or other component/device using the example component interface 212.

In some examples, the computational cost mapping table determination circuitry 104 includes means for identifying, means for generating, and means for converting. For example, the means for identify may be implemented by the instruction converter circuitry 204, the means for generating may be implemented by the cost determination circuitry 208, and the means for converting may be implemented by the instruction converter circuitry 204 or the architecture-specific compiler(s) 202. In some examples, the architecture-specific compiler(s) 202, the instruction converter circuitry 204, and/or the cost determination circuitry 208 may be instantiated by processor circuitry such as the example processor circuitry 512 of FIG. 5. For instance, the architecture-specific compiler(s) 202, the instruction converter circuitry 204, and/or the cost determination circuitry 208 may be instantiated by the example general purpose processor circuitry 600 of FIG. 6 executing machine executable instructions such as that implemented by at least blocks of FIGS. 3A and 3B. In some examples, the architecture-specific compiler(s) 202, the instruction converter circuitry 204, and/or the cost determination circuitry 208 may be instantiated by hardware logic circuitry, which may be implemented by an ASIC or the FPGA circuitry 700 of FIG. 7 structured to perform operations corresponding to the machine readable instructions. Additionally or alternatively, the architecture-specific compiler(s) 202, the instruction converter circuitry 204, and/or the cost determination circuitry 208 may be instantiated by any other combination of hardware, software, and/or firmware. For example, the architecture-specific compiler(s) 202, the instruction converter circuitry 204, and/or the cost determination circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the basic block execution cost determination circuitry 116 includes means for identifying, means for finding, and means for selecting, means for determining, and/or means for reporting. For example, the means for identifying may be implemented by the instruction conversion circuitry 214, the means for finding may be implemented by the cost estimation circuitry 216, and the means for selecting, the means for determining, and/or the means for reporting may be implemented by the calculation circuitry 218. In some examples, the instruction conversion circuitry 214, the cost estimation circuitry 216, and/or the calculation circuitry 218 may be instantiated by processor circuitry such as the example processor circuitry 512 of FIG. 5. For instance, the instruction conversion circuitry 214, the cost estimation circuitry 216, and/or the calculation circuitry 218 may be instantiated by the example general purpose processor circuitry 600 of FIG. 6 executing machine executable instructions such as that implemented by at least blocks of FIG. 4. In some examples, the instruction conversion circuitry 214, the cost estimation circuitry 216, and/or the calculation circuitry 218 may be instantiated by hardware logic circuitry, which may be implemented by an ASIC or the FPGA circuitry 700 of FIG. 7 structured to perform operations corresponding to the machine readable instructions. Additionally or alternatively, the instruction conversion circuitry 214, the cost estimation circuitry 216, and/or the calculation circuitry 218 may be instantiated by any other combination of hardware, software, and/or firmware. For example, the instruction conversion circuitry 214, the cost estimation circuitry 216, and/or the calculation circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the execution cost mapping table determination circuitry 104 and/or the basic block execution cost determination circuitry 116 of FIG. 1 is illustrated in FIG. 2, one or more of the elements, processes, and/or devices illustrated in FIG. 2 may be combined, divided, re-arranged, omitted, eliminated, and/or implemented in any other way. Further, the example network interface 200, the example architecture-specific compiler(s) 202, the example instruction converter circuitry 204, the example cost determination circuitry 208, the example component interface 210, 212, the example instruction conversion circuitry 214, the example cost estimation circuitry 216, the example calculation circuitry 218, and/or, more generally, the execution cost mapping table determination circuitry 104 and/or the basic block execution cost determination circuitry 116 of FIGS. 1-2, may be implemented by hardware, software, firmware, and/or any combination of hardware, software, and/or firmware. Thus, for example, any of the example network interface 200, the example architecture-specific compiler(s) 202, the example instruction converter circuitry 204, the example cost determination circuitry 208, the example component interface 210, 212, the example instruction conversion circuitry 214, the example cost estimation circuitry 216, the example calculation circuitry 218, and/or, more generally, the execution cost mapping table determination circuitry 104 and/or the basic block execution cost determination circuitry 116 of FIGS. 1-2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, the execution cost mapping table determination circuitry 104 and/or basic block execution cost determination circuitry 116 of FIGS. 1-2 is/are hereby expressly defined to include a non-transitory computer readable storage device or storage disk such as a memory, a digital versatile disk (DVD), a compact disk (CD), a Blu-ray disk, etc., including the software and/or firmware. Further still, the execution cost mapping table determination circuitry 104 and/or basic block execution cost determination circuitry 116 of FIGS. 1-2 may include one or more elements, processes, and/or devices in addition to, or instead of, those illustrated in FIG. 1-2, and/or may include more than one of any or all of the illustrated elements, processes, and devices.

Figure 3A:
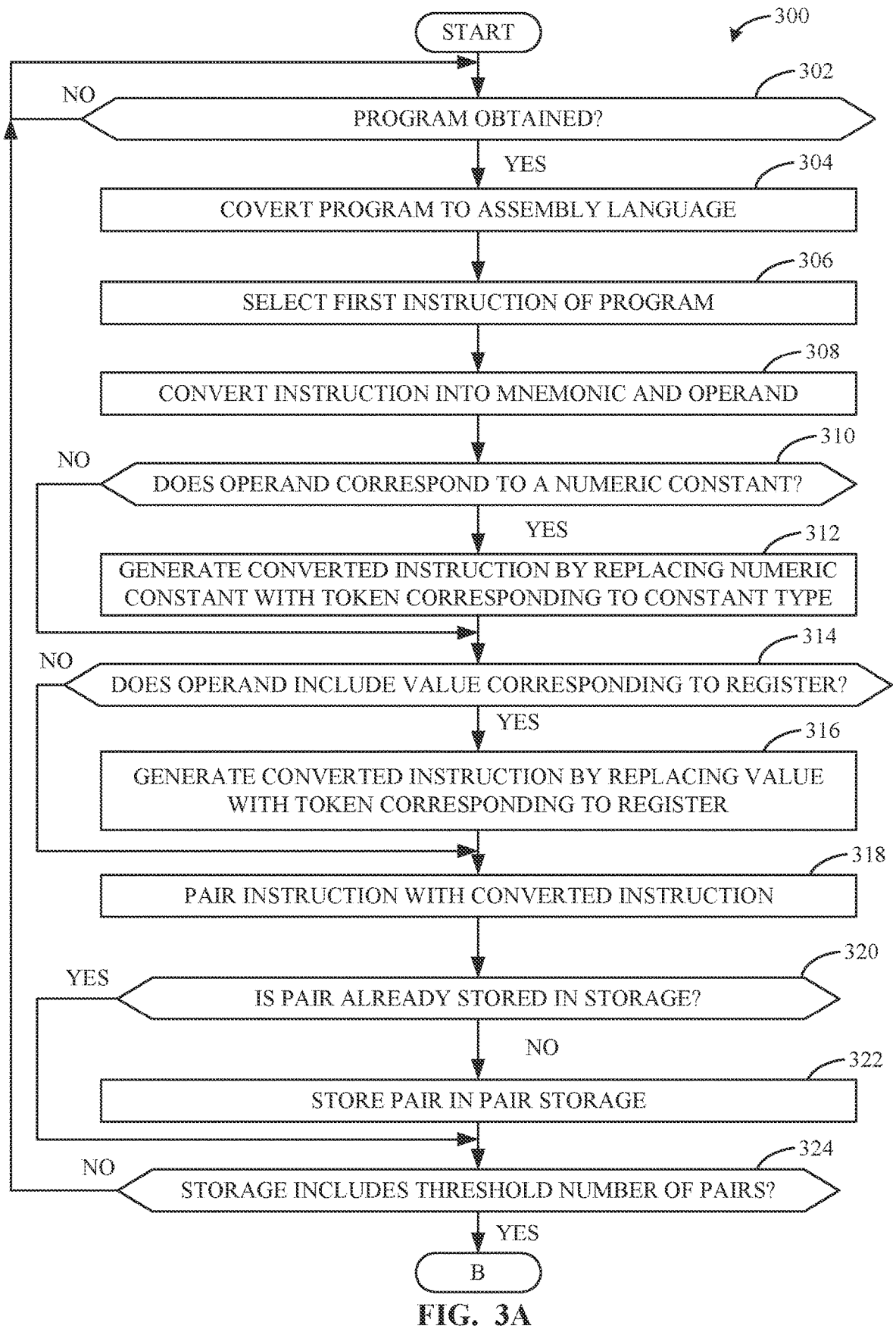
FIGS. 3A and 3B illustrate a flowchart representative of example machine readable instructions that may be executed by example processor circuitry to implement the execution cost mapping table determination circuitry of FIG. 2.
Figure 3B:
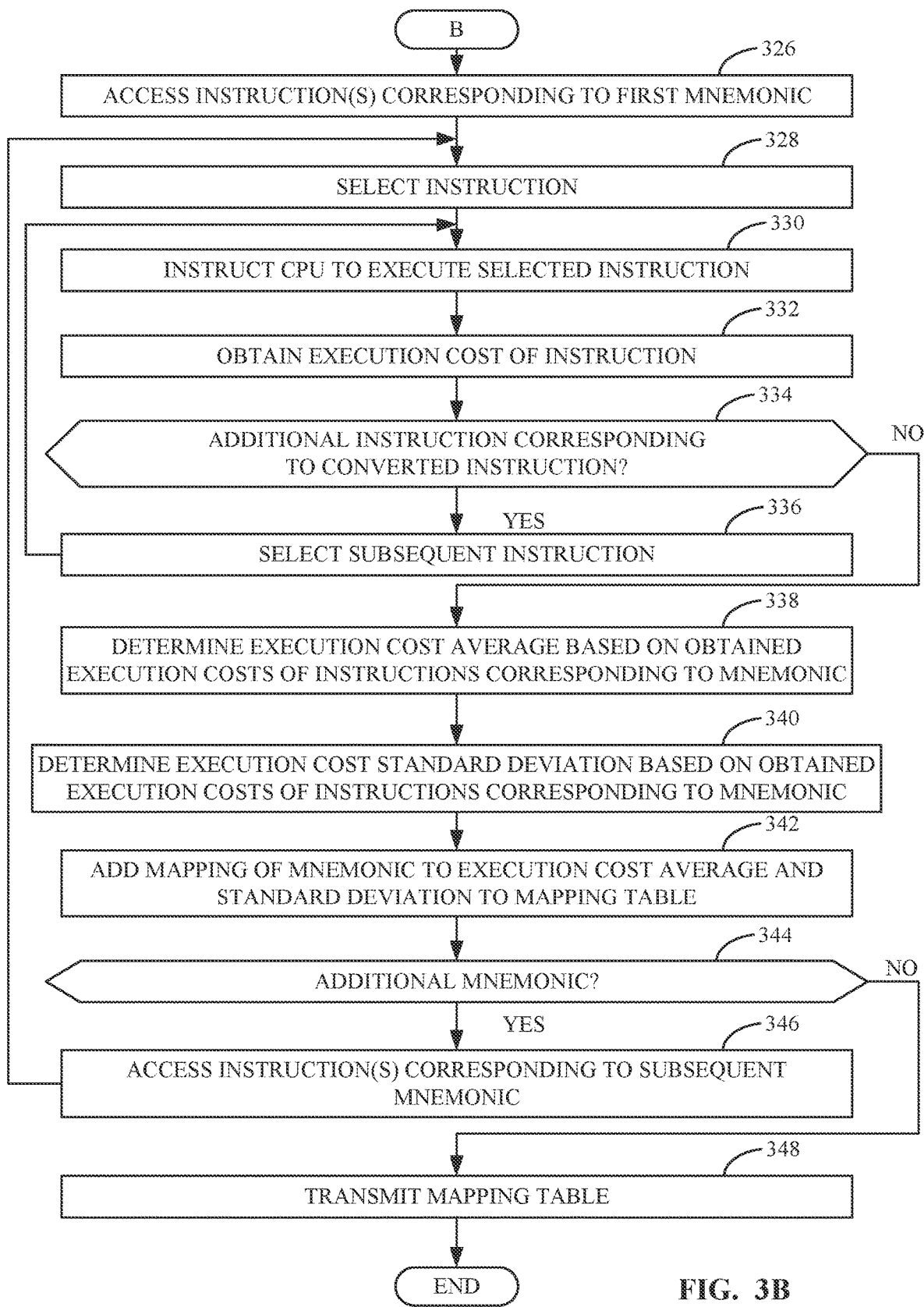

Flowcharts representative of example hardware logic circuitry, machine readable instructions, hardware implemented state machines, and/or any combination thereof for implementing the execution cost mapping table determination circuitry 104 and/or basic block execution cost determination circuitry 116 shown in FIGS. 3A, 3B and/or 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIG. 5. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3A, 3B, and/or 4, many other methods of implementing the execution cost mapping table determination circuitry 104 and/or basic block execution cost determination circuitry 116 of FIGS. 1-2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3A, 3B and/or 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 3A and 3B illustrate a flowchart representative of example machine readable instructions and/or example operations 300 that may be executed and/or instantiated by processor circuitry (e.g., the example execution cost mapping table determination circuitry 104 of FIG. 2) to determine develop an architecture-specific mapping table to provide to a computing device corresponding to the specific architecture. The instructions begin at block 302 when the architecture-specific compiler(s) 202 determine(s) if a program, code, and/or basic block has been obtained (e.g., via the network interface 200 for external data and/or via the component interface 210 for internal data).

At block 304, the example architecture-specific compiler(s) 202 converts the program, code, and/or basic block into assembly language. At block 306, the example instruction converter circuitry 204 selects a first instruction (e.g., a first line of the assembly instructions) from the assembly language of the program, code, and/or basic block. At block 308, the example instruction converter circuitry 204 converts the instruction of the assembly language into a mnemonic and an operand.

At block 310, the example instruction converter circuitry 204 determines if the operand corresponds to numeric constant(s). For example, does the operate include a numeric value or a value that corresponds to a number constant. If the example instruction converter circuitry 204 determines that the operand does not correspond to a numeric constant (block 310: NO), control continues to block 314. If the example instruction converter circuitry 204 determines that the operand corresponds to a numeric constant (block 310: YES), the instruction converter circuitry 204 generates a converted instruction (e.g., an abstraction of the instruction) by replacing the number or variable corresponding to the numeric constant with a token corresponding to the constant type (e.g., integer, Boolean, short, long, float, etc.) (block 312). In this manner, the specific numeric number is abstracted to a general number type.

At block 314, the example instruction converter circuitry 204 determines if the operand corresponds to a register operation (e.g., where a value will be accessed, stored, etc.). If the example instruction converter circuitry 204 determines that the operand does not correspond to a register (block 314: NO), instructions continue to block 318. If the example instruction converter circuitry 204 determines that the operand corresponds to a register (block 314: YES), the example instruction converter circuitry 204 generates a converted instruction (e.g., an abstraction of the instruction) by replacing the value corresponding to the register with a token corresponding to register (block 316). In this manner, the specific register number is abstracted to a general register token.

At block 318, the example instruction converter circuitry 204 pairs the instruction with the converted (e.g., abstract) instruction. At block 320, the example instruction converter circuitry 204 determines if the pair is already stored in the example pair storage 206 (e.g., to prevent duplicate pairs being stored). In some examples, the instruction converter circuitry 204 determines if abstraction of the instruction is already stored in the example pair storage 206 as opposed to the complete pair. If the example instruction converter circuitry 204 determines that a pair is already included in the pair storage 206 (block 320: YES), the pair is discarded and control continue to block 322. If the example instruction converter circuitry 204 determines that a pair is not already included in the pair storage 206 (block 320: YES), the example instruction converter circuitry 204 stores the pair in the example pair storage 206 (block 322).

At block 324, the example instruction converter circuitry 204 determines if the pair storage 206 includes a threshold number of pairs (e.g., entries). The less pairs stored in the example pair storage 206, the less robust the mapping table will be (e.g., less entries and possibly less accurate execution cost information), and the more pairs, the more resources, time, and input data needed. Accordingly, a user and/or manufacturer can define the threshold of entries to balance robustness with time, resources, and/or input data. If the example pair storage 206 does not include the threshold number of pairs (e.g., does not satisfy the threshold) (block 324: NO), control returns to block 302 to process additional programs, code and/or basic blocks. If the example pair storage 206 includes the threshold number of pairs (e.g., satisfies the threshold) (block 324: YES), the example cost determination circuitry 208 accesses the instruction(s) corresponding to a first mnemonic (block 326 of FIG. 3B).

At block 328, the example cost determination circuitry 208 selects a first instruction of the accessed instruction(s). At block 330, the example cost determination circuitry 208 instructs the CPU 105 to execute the selected instruction. For example, the cost determination circuitry 208 may transmit the instruction to the example CPU 105 via the component interface 210. As described above, the example CPU 105 may execute the instruction one or more times to determine the execution cost of the instruction. After the instruction is executed one or more times, the CPU 105 provides the execution cost of the instruction to the cost determination circuitry 208 via the component interface 210. At block 332, the example cost mapping circuitry obtains the execution cost of the instruction from the CPU 105 via the component interface 210.

At block 334, the example cost determination circuitry 208 determines if there is an additional instruction corresponding to the converted instruction. If the cost determination circuitry 208 determines that there is an additional instruction (block 334: YES), the example cost determination circuitry 208 selects the subsequent instruction (block 336) and control returns to block 330 to determine the execution cost of the additional instruction corresponding to the selected mnemonic. If the cost determination circuitry 208 determines that there is no additional instruction (block 334: NO), the example cost determination circuitry 208 determines the execution cost average based on an average of the execution costs of the instructions corresponding to the selected mnemonic (block 338).

At block 340, the example cost determination circuitry 208 determines the execution cost standard deviation based on the obtained execution costs of instructions corresponding to the mnemonic. At block 342, the example cost determination circuitry 208 adds an entry for a mapping of the mnemonic to the execution cost average and standard deviation in the mapping table. For the first entry, the example cost determination circuitry 208 generate the mapping table with the single entry. For subsequent entries, the example cost mapping circuitry adds entries to the previously generate mapping table. At block 344, the example cost determination circuitry 208 determines if there is an additional mnemonic in the pair storage 206 to be processed. If the example cost determination circuitry 208 determines that there is an additional mnemonic in the pair storage 206 (block 344 YES), the cost determination circuitry 208 accesses the instruction(s) corresponding to the subsequent mnemonic (block 346) and control returns to block 328. If the example cost determination circuitry 208 determines that there is not an additional mnemonic in the pair storage 206 (block 344 NO), the cost determination circuitry 208 deploys the mapping table to devices that correspond to the architecture via the network interface 200 (block 348).

Figure 4:
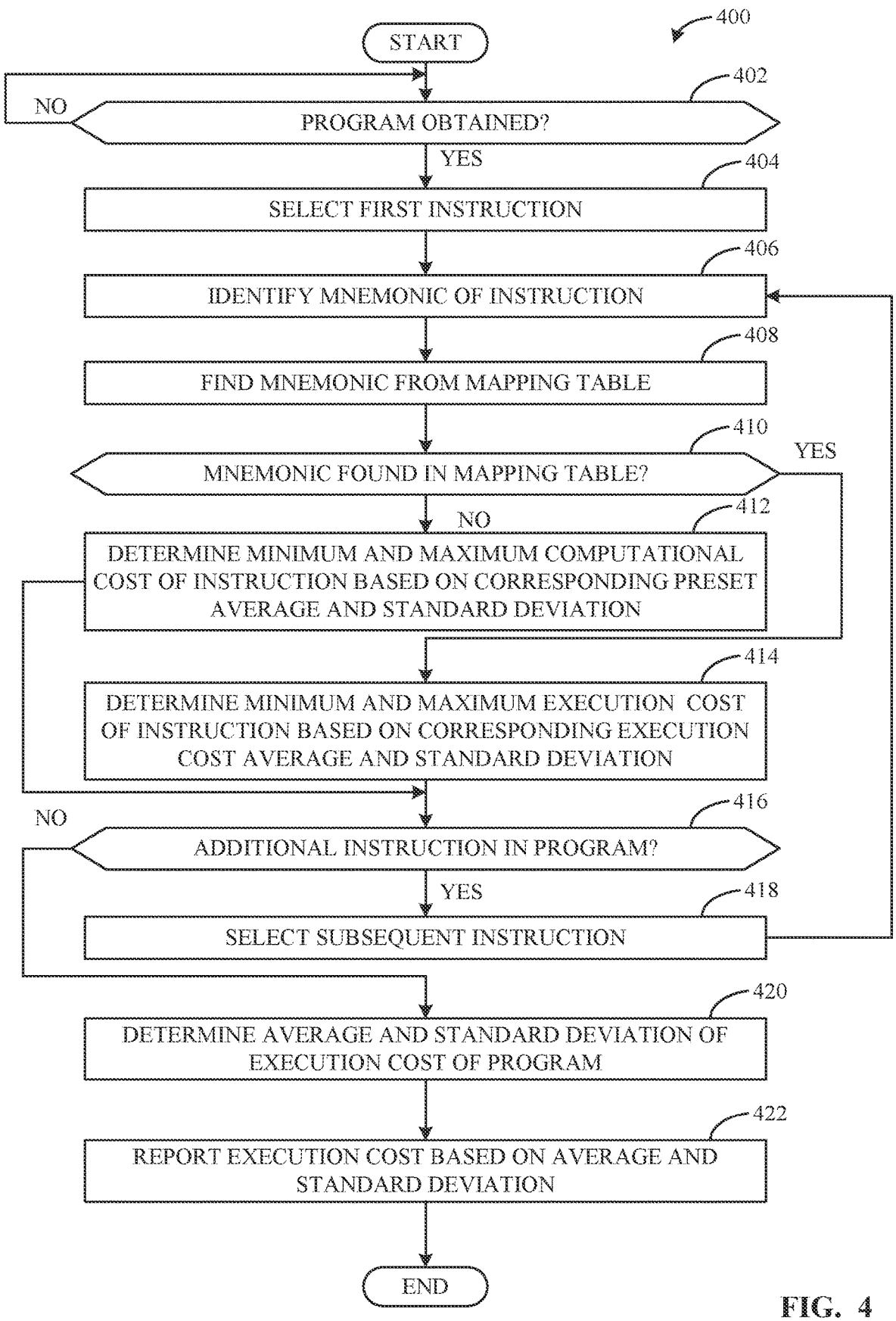
FIG. 4 illustrates a flowchart representative of example machine readable instructions that may be executed by example processor circuitry to implement the basic block execution cost determination circuitry of FIG. 2.

FIG. 4 is a flowchart representative of example machine readable instructions and/or example operations that may be executed and/or instantiated by processor circuitry (e.g., the basic block execution cost determination circuitry 116 of FIG. 2) to determine execution cost of a program, code, and/or basic block using a mapping table. The instructions begin at block 402 when the example instruction conversion circuitry 214 determines if a program, code, and/or a basic block has been obtained (e.g., via the component interface 212). It is assumed that the obtained program, code, and/or basic block is and/or has been converted to assembly language. If the obtained program, code, and/or basic block is not in assembly language, the example instruction conversion circuitry 214 converts the program, code, and/or basic block into assembly language.

If the example instruction conversion circuitry 214 determines that a program, code, and/or basic block has not been obtained (block 402: NO), control returns to block 402. If the example instruction conversion circuitry 214 determines that a program, code, and/or basic block has been obtained (block 402: YES), the example instruction conversion circuitry 214 selects a first instruction of the program, code, and/or basic block (block 404). At block 406, the example instruction conversion circuitry identifies the mnemonic and/or function of the selected instruction. At block 408, the example cost estimation circuitry 216 accesses (e.g., via the component interface 212) the mapping table in the mapping table storage 112 to attempt to find the mnemonic from the mapping table. If the example cost estimation circuitry 216 does not find the mnemonic and/or function in the mapping table (block 410: NO), the example calculation circuitry 218 determines a minimum and/or maximum execution cost of the instruction based on a corresponding preset average and/or standard deviation for the instruction (block 412). For example, the calculation circuitry 218 selects a preset average and standard deviation for the instruction and determines the minimum and/or maximum execution cost using the above Equations 1-2.

If the example cost estimation circuitry 216 finds the mnemonic and/or function in the mapping table (block 410: YES), the example calculation circuitry 218 determines a minimum and/or maximum execution cost of the instruction based on an average and/or standard deviation of the mnemonic based on the mapping table (block 414). For example, the calculation circuitry 218 determines the average and standard deviation for the instruction based on the average and standard deviation linked to (e.g., stored in association with) the mnemonic in an entry of the mapping data and determines the minimum and/or maximum execution cost using the above Equations 1-2. At block 416, the example instruction conversion circuitry 214 determines if there is an additional instruction in the obtained program, code, and/or basic block to be processed.

If the example instruction conversion circuitry 214 determines that there is an additional instruction in the obtained program, code, and/or basic block (block 416: YES), the example instruction conversion circuitry 214 selects the subsequent instruction (block 418) and control returns to block 406. If the example instruction conversion circuitry 214 determines that there is not an additional instruction in the obtained program, code, and/or basic block (block 416: NO), the example calculation circuitry 218 determines the average and standard deviation of the executed program based on the execution cost averages and/or the minimum and maximum execution costs of the instructions of the program, code, and/or basic block (block 420). For example, the calculation circuitry 218 determines the average and standard deviation of the execution cost for the program, code, and/or basic block using the above Equations 3-4. At block 422, the example calculation circuitry 218 reports the execution cost to the CPU 114 and/or another device (e.g., via the component interface 212) based on the average and standard deviation of the execution cost of the program, code, and/or basic block.

Figure 5:
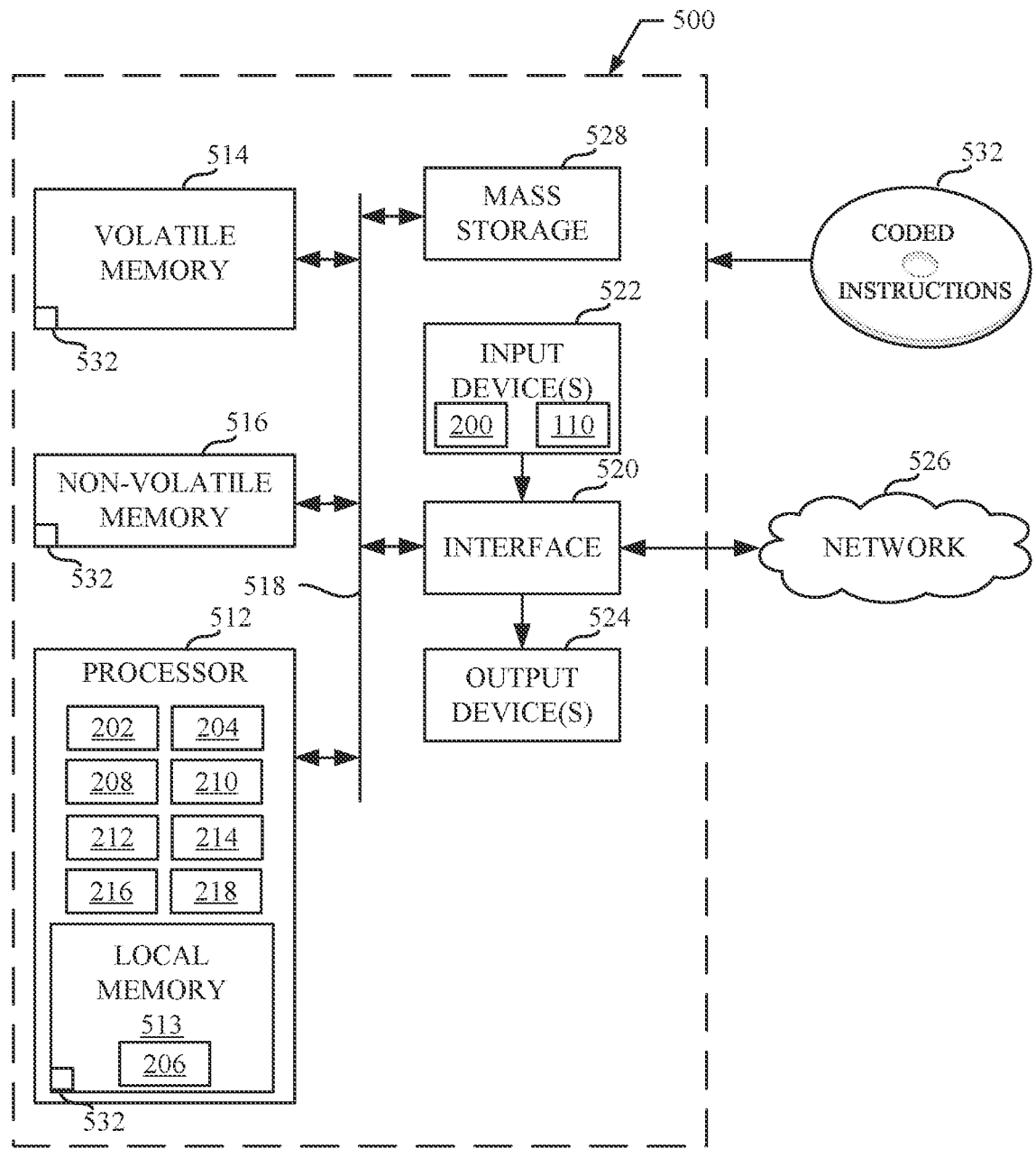
FIG. 5 is a block diagram of an example processing platform including processor circuitry structured to execute the example machine readable instructions of FIGS. 3A, 3B and/or 4 to implement the example computing device of FIG. 1.

FIG. 5 is a block diagram of an example processor platform 500 structured to execute and/or instantiate the machine readable instructions and/or operations of FIGS. 3A, 3B and/or 4 to implement the execution cost mapping table determination circuitry 104 and/or the basic block execution cost determination circuitry 116 of FIG. 2. The processor platform 500 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs microprocessors, CPUs, GPUs, DSPs, and/or microcontrollers from any desired family or manufacturer. The processor circuitry 512 may be implemented by one or more semiconductor based (e.g., silicon based) devices. When the processor platform 500 is implemented in the example server 102, the processor circuitry 512 implements the architecture-specific compiler (s) 202, the instruction converter circuitry 204, the cost determination circuitry 208, and/or the component interface 210. When the processor platform 500 is implemented in the example computing device 108, the processor circuitry 512 implements the component interface 212, the instruction conversion circuitry 214, the cost estimation circuitry 216, and the calculation circuitry 218.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517. Any one of the example memory 513, 514, 516 may implement the example mapping table storage 112 and/or the example pair storage 206 of FIG. 1 and/or 2.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In FIG. 2, the example interface 520 implements the example network interface 110 of FIG. 1 and/or the example network interface 200 of FIG. 2.

In the illustrated example, one or more input devices 522 are connected to the interface circuitry 520. The input device(s) 522 permit(s) a user to enter data and/or commands into the processor circuitry 512. The input device(s)

522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output devices 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 532, which may be implemented by the machine readable instructions of FIGS. 3A, 3B and/or 4, may be stored in the mass storage device 528, in the volatile memory 514, in the non-volatile memory 516, and/or on a removable non-transitory computer readable storage medium such as a CD or DVD.

Figure 6:
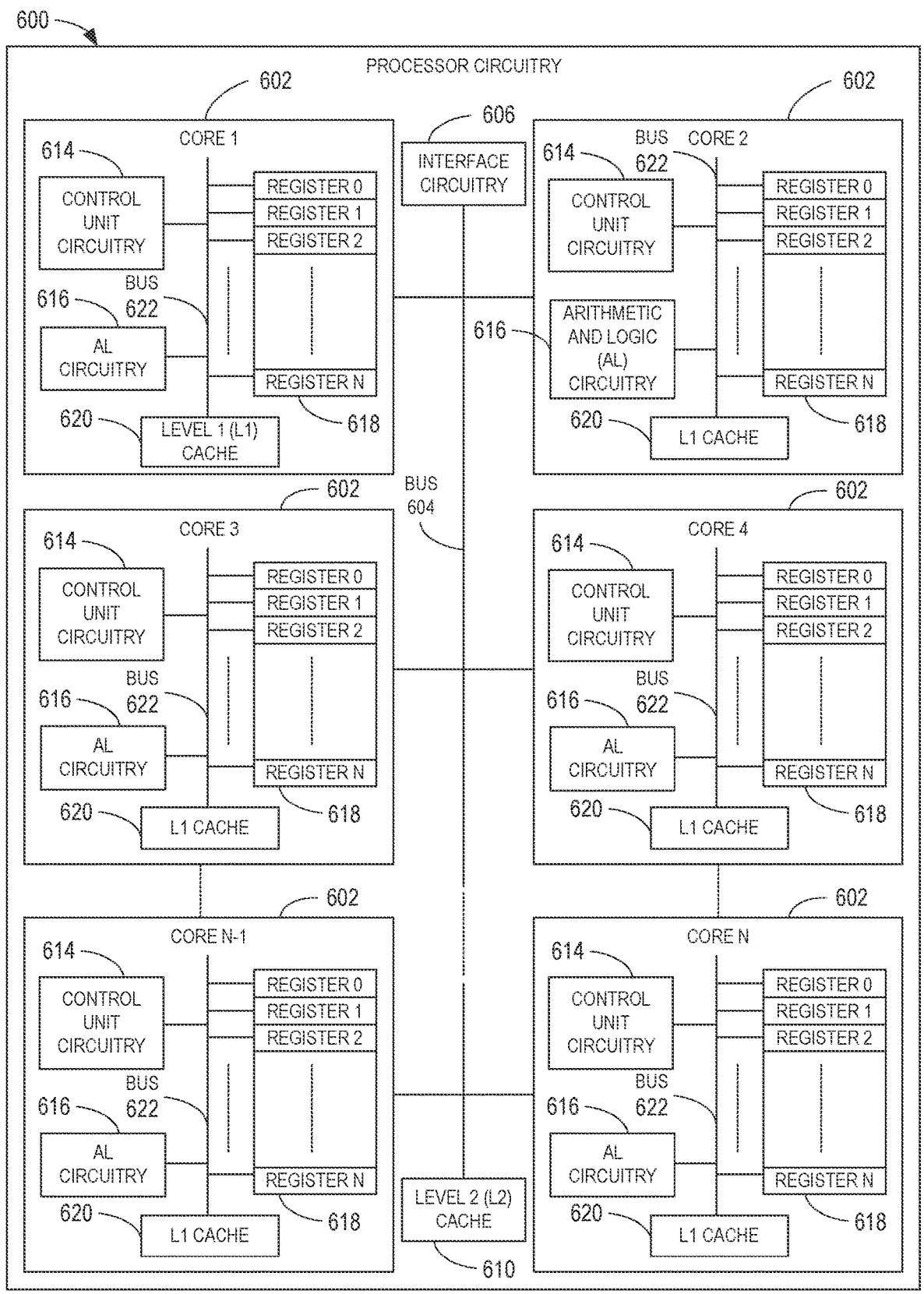
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3A, 3B, and/or 4

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2_cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic, and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The bus 620 may implement at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
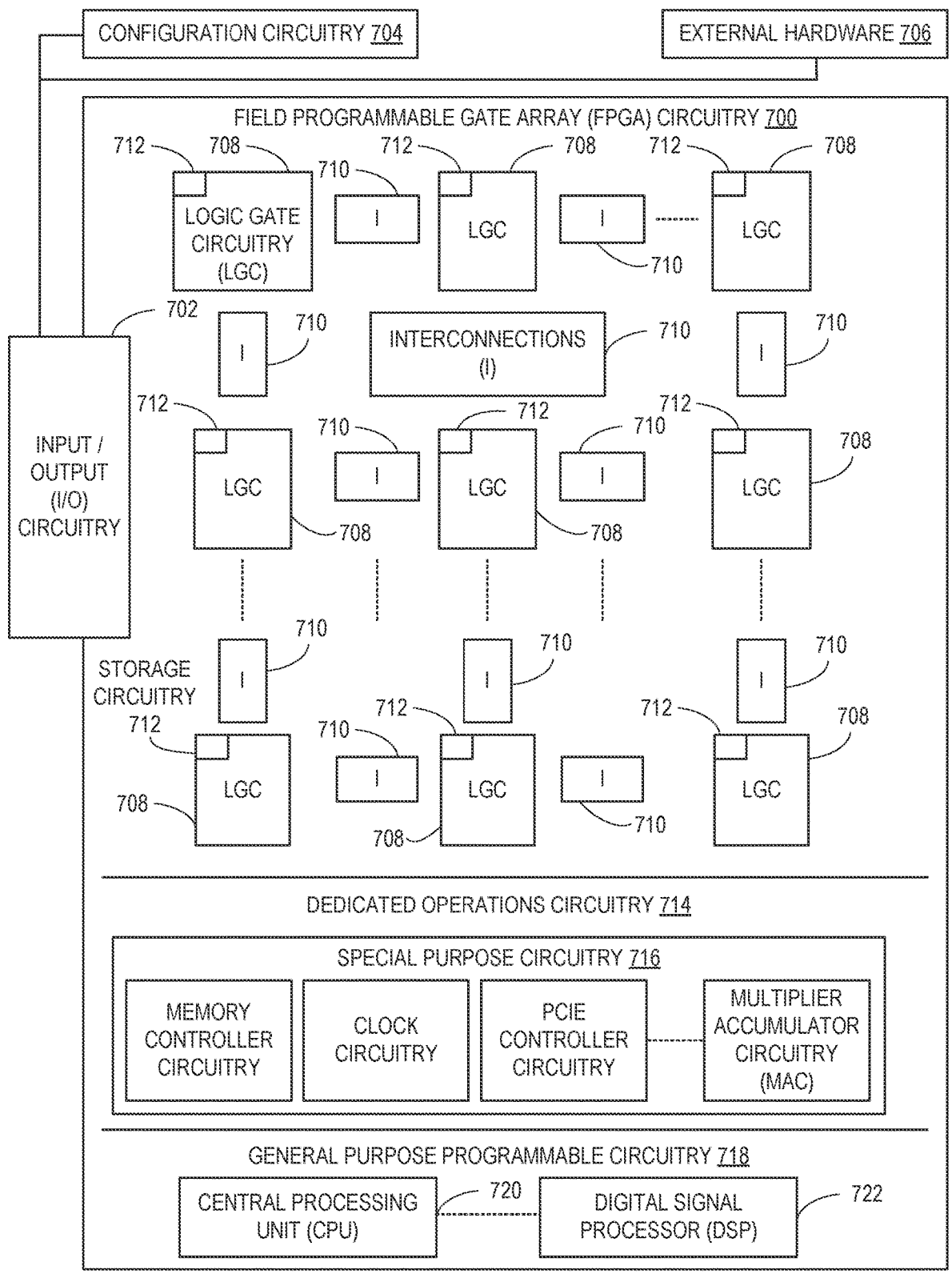
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3A, 3B, and/or 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3A, 3B, and/or 4. In particular, the FPGA 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3A, 3B, and/or 4. As such, the FPGA circuitry 700 may be structured to effectively instantiate some or all of the machine readable instructions of the flowcharts of FIGS. 3A, 3B, and/or 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 7 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 706 may implement the microprocessor 600 of FIG. 6. The FPGA circuitry 700 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions of FIG. 4-5 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIGS. 3A, 3B, and/or 4 may be executed by one or more of the cores 602 of FIG. 6 and a second portion of the machine readable instructions represented by the flowcharts of FIGS. 3A, 3B, and/or 4 may be executed by the FPGA circuitry 700 of FIG. 7.

In some examples, the processor circuitry 512 of FIG. 5 may be in one or more packages. For example, the processor circuitry 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
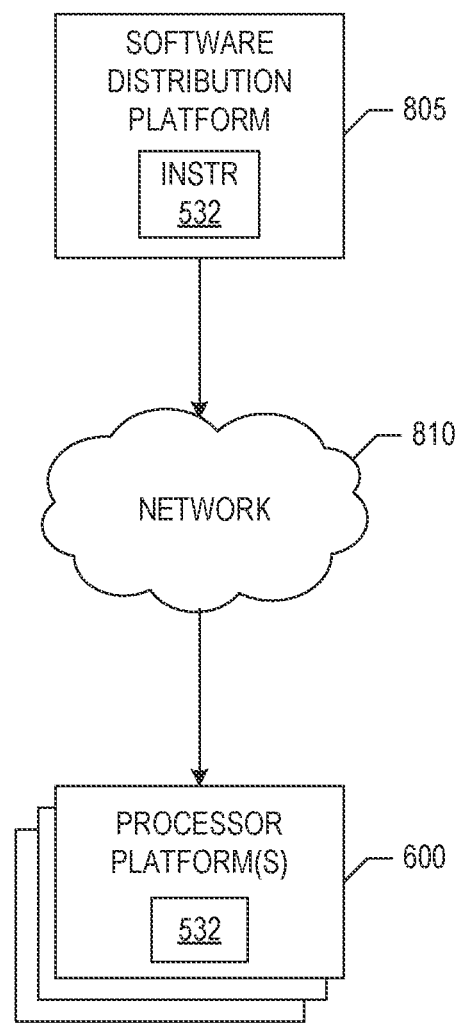
FIG. 8 is a block diagram of an example software distribution platform (e.g., one or more servers) to distribute software (e.g., software corresponding to the example machine readable instructions of FIGS. 3A, 3B and/or 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300, 400 of FIGS. 3A, 3B and/or 4, as described above. The one or more servers of the example software distribution platform 805 are in communication with a network 810, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300, 400 of FIGS. 3A, 3B and/or 4, may be downloaded to the example processor platform 500, which is to execute the machine readable instructions 532 to implement the execution cost mapping table determination circuitry 104. In some example, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

Example methods, apparatus, systems, and articles of manufacture to improve data quality for artificial intelligence are disclosed herein. Further examples and combinations thereof include the following: Example 1 includes an apparatus to generate a mapping table based on execution cost, the apparatus comprising memory, instructions included in the apparatus, and processor circuitry to execute the instructions to cause a plurality of instructions corresponding to a mnemonic to be executed, determine an average execution cost of the plurality of instructions, determine a standard deviation of execution costs of the plurality of instructions, and generate a mapping table including an entry, the entry including the mnemonic in association with the average and the standard deviation.

Example 2 includes the apparatus of example 1, wherein the processor circuitry is to cause the plurality of instructions to be executed on a processor unit specific to an architecture, the architecture corresponding to a computing device that obtains the mapping table to estimate execution cost.

Example 3 includes the apparatus of example 1, wherein the plurality of instructions is a first plurality of instructions, the processor circuitry is to convert a second plurality of instructions into mnemonics and operands, generate a converted instructions by replacing the operands with a token corresponding to the operands, and generate pairs by combining the instructions with the converted instructions.

Example 4 includes the apparatus of example 3, wherein the processor circuitry is to store the pairs in the memory, and access the first plurality of instruction corresponding to the mnemonic from the memory.

Example 5 includes the apparatus of example 3, wherein the processor circuitry is to determine whether a pair including at least one of a same mnemonic or a same operand is included in storage, and when the pair is already included in the storage, discard the pair.

Example 6 includes the apparatus of example 3, wherein the token corresponds to at least one of a constant type when the operand corresponds to a numeric constant or a register when the operand corresponds to a register operation.

Example 7 includes the apparatus of example 1, wherein the processor circuitry is to obtain the instructions from a repository, and convert the instructions into assembly language.

Example 8 includes a non-transitory computer readable medium comprising instructions which, when executed, cause one or more processors to at least cause a plurality of instructions corresponding to a mnemonic to be executed, determine an average execution cost of the plurality of instructions, determine a standard deviation of execution costs of the plurality of instructions, and generate a mapping table including an entry, the entry including the mnemonic in association with the average and the standard deviation.

Example 9 includes the computer readable storage medium of example 8, wherein the instructions cause the one or more processors to cause the plurality of instructions to be executed on a processor unit specific to an architecture, the architecture corresponding to a computing device that obtains the mapping table to estimate execution cost.

Example 10 includes the computer readable storage medium of example 8, wherein the plurality of instructions is a first plurality of instructions, the instructions to cause the one or more processors to convert a second plurality of instructions into mnemonics and operands, generate a converted instructions by replacing the operands with a token corresponding to the operands, and generate pairs by combining the instructions with the converted instructions.

Example 11 includes the computer readable storage medium of example 10, wherein the instructions cause the one or more processors to store the pairs in storage, and access the first plurality of instruction corresponding to the mnemonic from the storage.

Example 12 includes the computer readable storage medium of example 10, wherein the instructions cause the one or more processors to determine whether a pair including at least one of a same mnemonic or a same operand is included in storage, and when the pair is already included in the storage, discard the pair.

Example 13 includes the computer readable storage medium of example 10, wherein the token corresponds to at least one of a constant type when the operand corresponds to a numeric constant or a register when the operand corresponds to a register operation.

Example 14 includes the computer readable storage medium of example 8, wherein the instructions cause the one or more processors to obtain the instructions from a repository, and convert the instructions into assembly language.

Example 15 includes an apparatus to generate a mapping table based on execution cost, the apparatus comprising interface circuitry, and processor circuitry including one or more of at least one of a central processing unit, a graphic processing unit or a digital signal processor, the at least one of the central processing unit, the graphic processing unit or the digital signal processor having control circuitry, one or more registers, and arithmetic and logic circuitry to perform one or more first operations corresponding to instructions in the apparatus, and, a Field Programmable Gate Array (FPGA), the FPGA including logic gate circuitry, a plurality of configurable interconnections, and storage circuitry, the logic gate circuitry and interconnections to perform one or more second operations, or Application Specific Integrate Circuitry (ASIC) including logic gate circuitry to perform one or more third operations, the processor circuitry to perform at least one of the first operations, the second operations or the third operations to instantiate cost mapping circuitry to cause a plurality of instructions corresponding to a mnemonic to be executed, determine an average execution cost of the plurality of instructions, determine a standard deviation of execution costs of the plurality of instructions, and generate a mapping table including an entry, the entry including the mnemonic in association with the average and the standard deviation.

Example 16 includes the apparatus of example 15, wherein the cost mapping circuitry is to cause the plurality of instructions to be executed on a processor unit specific to an architecture, the architecture corresponding to a computing device that obtains the mapping table to estimate execution cost.

Example 17 includes the apparatus of example 15, wherein the plurality of instructions is a first plurality of instructions, further including instruction converter circuitry is to convert a second plurality of instructions into mnemonics and operands, generate a converted instructions by replacing the operands with a token corresponding to the operands, and generate pairs by combining the instructions with the converted instructions.

Example 18 includes the apparatus of example 17, wherein the instruction converter circuitry is to store the pairs in the storage, and the cost mapping circuitry is to access the first plurality of instruction corresponding to the mnemonic from the storage.

Example 19 includes the apparatus of example 17, wherein the cost mapping circuitry is to determine whether a pair including at least one of a same mnemonic or a same operand is included in storage, and when the pair is already included in the storage, discard the pair.

Example 20 includes the apparatus of example 17, wherein the token corresponds to at least one of a constant type when the operand corresponds to a numeric constant or a register when the operand corresponds to a register operation.

Example 21 includes the apparatus of example 15, further including an architecture-specific compiler to obtain the instructions from a repository, and convert the instructions into assembly language.

Example 22 includes an apparatus to generate a mapping table based on execution cost, the apparatus comprising means for identify a mnemonic of a plurality of instructions, means for generating a mapping table, the means for generating to cause the plurality of instructions corresponding to the mnemonic to be executed, determine an average execution cost of the plurality of instructions, determine standard deviation of execution costs of the plurality of instructions, and generate a mapping table including an entry, the entry including the mnemonic in association with the average and the standard deviation.

Example 23 includes the apparatus of example 22, wherein the means for generating is to cause the plurality of instructions to be executed on a processor unit specific to an architecture, the architecture corresponding to a computing device that obtains the mapping table to estimate execution cost.

Example 24 includes the apparatus of example 22, wherein the plurality of instructions is a first plurality of instructions, further including means for converting, the means for converting to convert a second plurality of instructions into mnemonics and operands, generate a converted instructions by replacing the operands with a token corresponding to the operands, and generate pairs by combining the instructions with the converted instructions.

Example 25 includes the apparatus of example 24, wherein the means for converting is to store the pairs in storage, and access the first plurality of instruction corresponding to the mnemonic from the storage.

Example 26 includes the apparatus of example 24, wherein the means for generating is to determine whether a pair including at least one of a same mnemonic or a same operand is included in storage, and when the pair is already included in the storage, discard the pair.

Example 27 includes the apparatus of example 24, wherein the token corresponds to at least one of a constant type when the operand corresponds to a numeric constant or a register when the operand corresponds to a register operation.

Example 28 includes the apparatus of example 22, further including means for converting, the means for converting to obtain the instructions from a repository, and convert the instructions into assembly language.

Example 29 includes a method to generate a mapping table based on execution cost, the method comprising causing a plurality of instructions corresponding to a mnemonic to be executed, determining, by executing an instruction with one or more processors, an average execution cost of the plurality of instructions, determining, by executing an instruction with the one or more processors, a standard deviation of execution costs of the plurality of instructions, and generating, by executing an instruction with the one or more processors, a mapping table including an entry, the entry including the mnemonic in association with the average and the standard deviation.

Example 30 includes the method of example 29, further including causing the plurality of instructions to be executed on a processor unit specific to an architecture, the architecture corresponding to a computing device that obtains the mapping table to estimate execution cost.

Example 31 includes the method of example 29, wherein the plurality of instructions is a first plurality of instructions, further including converting a second plurality of instructions into mnemonics and operands, generating a converted instructions by replacing the operands with a token corresponding to the operands, and generating pairs by combining the instructions with the converted instructions.

Example 32 includes the method of example 31, further including storing the pairs in the storage, and accessing the first plurality of instruction corresponding to the mnemonic from the storage.

Example 33 includes the method of example 31, further including determining whether a pair including at least one of a same mnemonic or a same operand is included in storage, and when the pair is already included in the storage, discarding the pair.

Example 34 includes the method of example 31, wherein the token corresponds to at least one of a constant type when the operand corresponds to a numeric constant or a register when the operand corresponds to a register operation.

Example 35 includes the method of example 29, further including obtaining the instructions from a repository, and converting the instructions into assembly language.

From the foregoing, it will be appreciated that example systems, methods, apparatus, and articles of manufacture have been disclosed that determine execution cost. To determine the execution cost of instructions, some techniques run the instructions prior to executing the instructions to identify the code execution. However, such techniques are expensive and time consuming. Other techniques have been used to estimate execution cost using models and/or other tools. However, such techniques may be inaccurate and/or require large maintenance overhead. Some techniques use artificial intelligence (AI) to predict the execution cost of a set of instructions. Although such techniques are accurate, such techniques are computationally intensive and AI-based techniques do not provide an explanation for a result.

Examples disclosed herein include a server that develops architecture-specific mapping tables that maps converted instructions (e.g., abstractions of instructions based on the leading mnemonic and/or function of an instruction line) to an average execution cost and standard deviation cost. Using examples disclosed herein, the server can obtain programs and/or basic blocks of code from storage (e.g., open-source repositories, crowd-sourced repositories, closed-source repositories, local storage, external stored, local databases, external databases, etc.), execute lines of the code to identify execution costs corresponding to the function and/or mnemonic of the line of code and map the mnemonic to the average execution cost and the standard deviation of the execution cost. Examples disclosed herein develops an approach that is accurate, explainable, and executes using less processor resources that the above-mentioned techniques. Thus, the disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to generate a mapping table based on execution cost, the apparatus comprising:
   memory;
   instructions included in the apparatus; and
   processor circuitry to execute the instructions to:
      convert a plurality of instructions into mnemonics and operands;
      generate converted instructions by replacing the operands with corresponding tokens;
      generate unique pairs by combining respective ones of the plurality of instructions with the corresponding converted instructions;
      execute a portion of the plurality of instructions corresponding to a mnemonic, the portion of the plurality of instructions selected from the generated pairs;
      determine an average execution cost of the portion of the plurality of instructions;
      determine a standard deviation of execution costs of the portion of the plurality of instructions; and
      generate a mapping table including an entry, the entry including the mnemonic in association with the average and the standard deviation.

2. The apparatus of claim 1, wherein the processor circuitry is to execute the portion of the plurality of instructions on a processor unit specific to an architecture, the architecture corresponding to a computing device that obtains the mapping table to estimate execution cost.

3. The apparatus of claim 1, wherein the processor circuitry is to:
   store the unique pairs in the memory; and
   access the portion of the plurality of instructions corresponding to the mnemonic from the memory.

4. The apparatus of claim 1, wherein the processor circuitry is to:
   determine whether a pair including at least one of a same mnemonic or a same operand is included in storage; and
   when the pair is already included in the storage, discard the pair.

5. The apparatus of claim 1, wherein the token corresponds to at least one of a constant type when the operand corresponds to a numeric constant or a register when the operand corresponds to a register operation.

6. The apparatus of claim 1, wherein the processor circuitry is to:
   obtain the instructions from a repository; and
   convert the instructions into assembly language.

7. A non-transitory computer readable medium comprising instructions which, when executed, cause one or more processors to at least:
   convert a plurality of instructions into mnemonics and operands;
   generate converted instructions by replacing the operands with corresponding tokens;
   generate unique pairs by combining respective ones of the plurality of instructions with the corresponding converted instructions;
   execute a portion of the plurality of instructions corresponding to a mnemonic, the portion of the plurality of instructions selected from the generated pairs;
   determine an average execution cost of the portion of the plurality of instructions;
   determine a standard deviation of execution costs of the portion of the plurality of instructions; and generate a mapping table including an entry, the entry including the mnemonic in association with the average and the standard deviation.

8. The computer readable medium of claim 7, wherein the instructions cause the one or more processors to execute the portion of the plurality of instructions on a processor unit specific to an architecture, the architecture corresponding to a computing device that obtains the mapping table to estimate execution cost.

9. The computer readable medium of claim 8, wherein the instructions cause the one or more processors to:
store the unique pairs in storage; and
access the portion of the plurality of instructions corresponding to the mnemonic from the storage.

10. The computer readable storage medium of claim 8, wherein the instructions cause the one or more processors to:
determine whether a pair including at least one of a same mnemonic or a same operand is included in storage; and
when the pair is already included in the storage, discard the pair.

11. The computer readable medium of claim 8, wherein the token corresponds to at least one of a constant type when the operand corresponds to a numeric constant or a register when the operand corresponds to a register operation.

12. The computer readable medium of claim 7, wherein the instructions cause the one or more processors to:
obtain the instructions from a repository; and
convert the instructions into assembly language.

13. An apparatus to generate a mapping table based on execution cost, the apparatus comprising:
interface circuitry; and
processor circuitry including one or more of:
at least one of a central processing unit, a graphic processing unit or a digital signal processor, the at least one of the central processing unit, the graphic processing unit or the digital signal processor having control circuitry, one or more registers, and arithmetic and logic circuitry to perform one or more first operations corresponding to instructions in the apparatus, and;
a Field Programmable Gate Array (FPGA), the FPGA including logic gate circuitry, a plurality of configurable interconnections, and storage circuitry, the logic gate circuitry and interconnections to perform one or more second operations; or
Application Specific Integrate Circuitry (ASIC) including logic gate circuitry to perform one or more third operations;
the processor circuitry to perform at least one of the first operations, the second operations or the third operations to instantiate:
instruction converter circuitry to:
convert a plurality of instructions into mnemonics and operands;
generate converted instructions by replacing the operands with corresponding tokens;
generate unique pairs by combining respective ones of the plurality of instructions with the corresponding converted instructions;
cost mapping circuitry to:
execute a portion of the plurality of instructions corresponding to a mnemonic, the portion of the plurality of instructions selected from the generated pairs;
determine an average execution cost of the portion of the plurality of instructions;
determine a standard deviation of execution costs of the portion of the plurality of instructions; and
generate a mapping table including an entry, the entry including the mnemonic in association with the average and the standard deviation.

14. The apparatus of claim 13, wherein the cost mapping circuitry is to execute the portion of the plurality of instructions on a processor unit specific to an architecture, the architecture corresponding to a computing device that obtains the mapping table to estimate execution cost.

15. The apparatus of claim 13, wherein:
the instruction converter circuitry is to store the unique pairs in storage; and
the cost mapping circuitry is to access the portion of the plurality of instructions corresponding to the mnemonic from the storage.

16. The apparatus of claim 13, wherein the cost mapping circuitry is to:
determine whether a pair including at least one of a same mnemonic or a same operand is included in storage; and
when the pair is already included in the storage, discard the pair.

17. The apparatus of claim 13, wherein the token corresponds to at least one of a constant type when the operand corresponds to a numeric constant or a register when the operand corresponds to a register operation.

18. The apparatus of claim 13, further including an architecture-specific compiler to:
obtain the instructions from a repository; and
convert the instructions into assembly language.

19. A method to generate a mapping table based on execution cost, the method comprising:
converting, by executing an instruction with one or more processors, a plurality of instructions into mnemonics and operands;
generating, by executing an instruction with the one or more processors, converted instructions by replacing the operands with corresponding tokens;
generating, by executing an instruction with the one or more processors, unique pairs by combining respective ones of the plurality of instructions with the corresponding converted instructions;
executing a portion of the plurality of instructions corresponding to a mnemonic, the portion of the plurality of instructions selected from the generated pairs;
determining, by executing an instruction with the one or more processors, an average execution cost of the portion of the plurality of instructions;
determining, by executing an instruction with the one or more processors, a standard deviation of execution costs of the portion of the plurality of instructions; and
generating, by executing an instruction with the one or more processors, a mapping table including an entry, the entry including the mnemonic in association with the average and the standard deviation.

20. The method of claim 19, further including executing the portion of the plurality of instructions on a processor unit specific to an architecture, the architecture corresponding to a computing device that obtains the mapping table to estimate execution cost.

21. The method of claim 19, further including:
storing the unique pairs in storage; and
accessing the portion of the plurality of instructions corresponding to the mnemonic from the storage.

* * * * *